(12) United States Patent
Kobayashi et al.

(10) Patent No.: US 12,311,939 B2
(45) Date of Patent: May 27, 2025

(54) RAPID ACCELERATION SUPPRESSION DEVICE

(71) Applicant: HONDA MOTOR CO., LTD., Tokyo (JP)

(72) Inventors: Shinya Kobayashi, Tokyo (JP); Fumiaki Yoshikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 18/188,726

(22) Filed: Mar. 23, 2023

(65) Prior Publication Data

US 2023/0303071 A1   Sep. 28, 2023

(30) Foreign Application Priority Data

Mar. 28, 2022   (JP) .................................. 2022-052370

(51) Int. Cl.
*B60W 30/14* (2006.01)
*B60Q 1/46* (2006.01)
(Continued)

(52) U.S. Cl.
CPC ........... *B60W 30/146* (2013.01); *B60Q 9/008* (2013.01); *B60W 30/09* (2013.01); *B60Q 1/46* (2013.01);
(Continued)

(58) Field of Classification Search
CPC .... B60W 30/09; B60W 30/14; B60W 30/146; B60W 2554/4041; B60W 2554/802;
(Continued)

(56) References Cited

U.S. PATENT DOCUMENTS 8,060,289 B2 * 11/2011 Takae .................... B60W 30/16
                                                         180/169
11,014,554 B2 * 5/2021 Ito ............................. B60T 7/22
(Continued)

FOREIGN PATENT DOCUMENTS

CN          104648184 A        5/2015
CN          104797477 A    *   7/2015   ............. B60K 28/10
(Continued)

OTHER PUBLICATIONS

Japanese Office Action received in corresponding Japanese application No. 2022-052370 dated Feb. 6, 2024 with English translation(15 pages).

*Primary Examiner* — Atul Trivedi
(74) *Attorney, Agent, or Firm* — Rankin, Hill & Clark LLP

(57) ABSTRACT

A rapid acceleration suppression device of a subject vehicle includes: an information acquisition part configured to acquire information on vehicle speed and time-series information on accelerator position; a determination part configured to determine whether or not the accelerator has been performed abnormally, based on the time-series information on the accelerator position; and a control part configured to provide control over a drive force of the subject vehicle, based on a current vehicle speed and a current accelerator position. If the determination part determines that the accelerator has been performed abnormally, the control part allows an acceleration of the subject vehicle within a range within which the current vehicle speed does not exceed a preset upper limit vehicle speed.

10 Claims, 8 Drawing Sheets

(51) Int. Cl.
*B60Q 9/00* (2006.01)
*B60W 30/09* (2012.01)

(52) U.S. Cl.
CPC ..... *B60W 2520/06* (2013.01); *B60W 2520/10* (2013.01); *B60W 2540/10* (2013.01); *B60W 2552/15* (2020.02); *B60W 2554/4041* (2020.02); *B60W 2554/802* (2020.02); *B60W 2720/106* (2013.01)

(58) Field of Classification Search
CPC ......... B60W 2556/10; B60W 2552/00; B60W 2552/15; B60W 2520/06; B60W 2520/10; B60W 2540/10; B60W 2540/165; B60W 2540/18; B60W 2720/10; B60W 2720/106; B60W 50/087; B60Q 9/008; B60Q 1/46
USPC .......................................................... 701/93
See application file for complete search history.

(56) References Cited

U.S. PATENT DOCUMENTS

| | | | |
|---|---|---|---|
| 2005/0219058 A1* | 10/2005 | Katagiri | B60W 40/09 340/576 |
| 2010/0023234 A1 | 1/2010 | Kameyama et al. | |
| 2019/0039624 A1 | 2/2019 | Ike et al. | |
| 2019/0092327 A1* | 3/2019 | Osaki | B60W 30/16 |
| 2019/0291728 A1* | 9/2019 | Shalev-Shwartz | G01S 17/86 |
| 2020/0031347 A1* | 1/2020 | Shenker | F02D 41/2432 |
| 2020/0331474 A1 | 10/2020 | Oda et al. | |
| 2021/0046946 A1* | 2/2021 | Nemec | B60W 50/10 |
| 2021/0122366 A1* | 4/2021 | Lee | B60W 30/09 |
| 2021/0237719 A1 | 8/2021 | Chen et al. | |
| 2021/0291836 A1* | 9/2021 | Cho | B60W 30/18054 |
| 2021/0370780 A1* | 12/2021 | Cho | B60L 15/2009 |
| 2021/0387633 A1 | 12/2021 | Shimomura et al. | |
| 2022/0080942 A1* | 3/2022 | Eberl | B60L 15/10 |
| 2022/0089160 A1* | 3/2022 | Son | B60W 30/188 |
| 2023/0191918 A1* | 6/2023 | Usui | B60W 30/146 701/22 |
| 2023/0303071 A1* | 9/2023 | Kobayashi | B60W 30/146 |
| 2023/0322208 A1* | 10/2023 | Rojas | B60W 50/085 701/41 |

FOREIGN PATENT DOCUMENTS

| | | | | |
|---|---|---|---|---|
| CN | 112061124 A | * | 12/2020 | |
| CN | 112606762 A | * | 4/2021 | ............. B60K 26/02 |
| CN | 114559948 A | * | 5/2022 | |
| CN | 118182436 A | * | 6/2024 | |
| DE | 102016008363 B4 | * | 7/2021 | .......... B60W 30/143 |
| JP | 2006-264533 A | | 10/2006 | |
| JP | 2009-156092 A | | 7/2009 | |
| JP | 2010-023769 A | | 2/2010 | |
| JP | 2011-173586 A | | 9/2011 | |
| JP | 2015-110378 A | | 6/2015 | |
| JP | 2018-193911 A | | 12/2018 | |
| JP | 2019-026129 A | | 2/2019 | |
| JP | 2019-143484 A | | 8/2019 | |
| JP | 2020-021149 A | | 2/2020 | |
| JP | 2020-175849 A | | 10/2020 | |
| JP | 2021-194943 A | | 12/2021 | |
| KR | 20230172054 A | * | 12/2023 | |
| KR | 20240124570 A | * | 8/2024 | |
| WO | WO-2019180843 A1 | * | 9/2019 | ................ B60T 7/22 |

* cited by examiner

RAPID ACCELERATION SUPPRESSION DEVICE

CROSS REFERENCE TO RELATED APPLICATIONS

This application claims the benefit of Japanese Patent Application No. 2022-052370 filed on Mar. 28, 2022, the disclosure of which is incorporated herein by reference.

BACKGROUND OF THE INVENTION

1. Field of the Invention

The present invention relates to a rapid acceleration suppression device that suppresses a rapid acceleration of a subject vehicle, caused by an erroneous operation of an accelerator pedal.

2. Description of the Related Art

A technique of rapid acceleration suppression has been known that suppresses a rapid acceleration of a subject vehicle, caused by an erroneous operation of an accelerator pedal (see, for example, Japanese Laid-Open Patent Application, Publication No. 2011-173586 (which may also be referred to as Patent Document 1).

Patent Document 1 discloses the technique of rapid acceleration suppression in which a runaway is prevented by putting an engine in a state of idling by making a throttle valve fixedly fully closed when a misstep of an accelerator is performed with a shift position being in advancing or retreating and a direction indicator not operated.

A sudden or strong treading of the accelerator for acceleration is often made when entering into an express highway, changing a lane, overtaking another car, and turning to right or left, so that it is necessary not to limit an output of an engine.

In order that this operation should be done without increasing any burden on a driver, arrangement of releasing the fixing of full-closure of the throttle valve is made, so that no limitation of the engine output is brought into action by the detection of the presence of operation of a direction indicator, the operation being performed without fail, for enabling further running of the car.

The rapid acceleration suppression technique disclosed in Patent Document 1 can prevent a runaway of an automatic transmission car due to a misstep of an accelerator thereof.
[Patent Document 1] Japanese Laid-Open Patent Application, Publication No. 2011-173586

SUMMARY OF THE INVENTION

The rapid acceleration suppression technique disclosed in Patent Document 1 discloses that, when an operation of the direction indicator is detected, the subject vehicle can run with a rapid acceleration by cancelling a limit of the engine output. Patent Document 1 fails to, however, teach or suggest to what extent the rapid acceleration run is acceptable, while taking into account both smooth traveling and safety of the vehicle.

Thus, there is still a need for realizing a rapid acceleration suppression control under which smooth travelling and safety of the vehicle can be achieved in a compatible manner.

In light of the above-described, the present invention has been made in an attempt to provide a rapid acceleration suppression device capable of realizing smooth travelling and safety of a vehicle in a compatible manner.

A rapid acceleration suppression device of a subject vehicle of the present invention provides a rapid acceleration suppression control over the subject vehicle such that a rapid acceleration thereof caused by an abnormal operation of an accelerator is suppressed. The rapid acceleration suppression device includes: an information acquisition part configured to acquire information on vehicle speed and time-series information on accelerator position; a determination part configured to determine whether or not the accelerator has been performed abnormally, based on the time-series information on the accelerator position; and a control part configured to provide control over a drive force of the subject vehicle, based on a current vehicle speed and a current accelerator position. If the determination part determines that the accelerator has been performed abnormally, the control part allows an acceleration of the subject vehicle within a range within which the current vehicle speed does not exceed a preset upper limit vehicle speed.

The rapid acceleration suppression device of the present invention can realize a rapid acceleration suppression control under which smooth travelling and safety of a subject vehicle can be achieved in a compatible manner.

DETAILED DESCRIPTION OF THE EMBODIMENTS

Figure 1A:
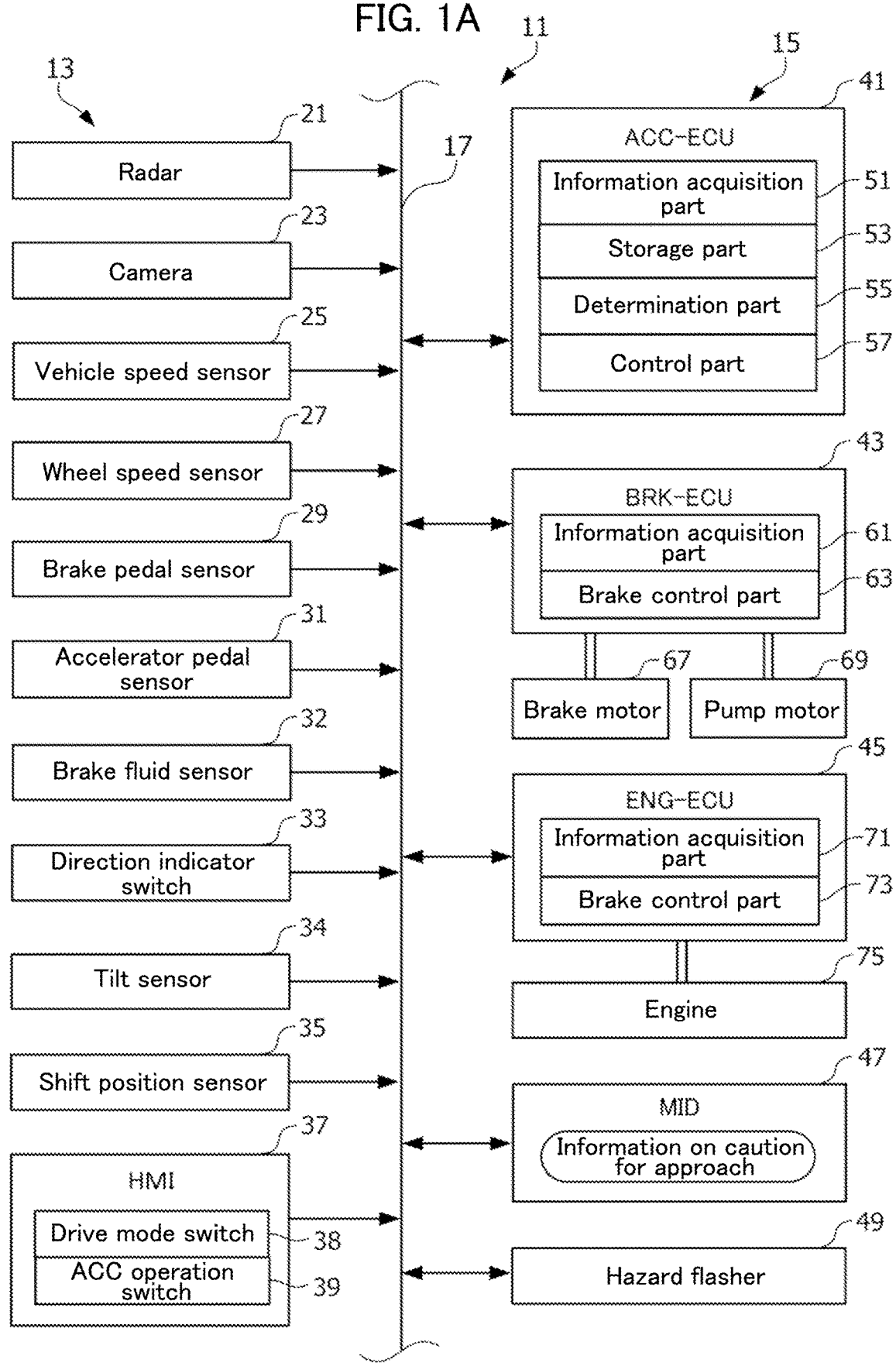
FIG. 1A is a block configuration diagram illustrating an outline of a rapid acceleration suppression device according to an embodiment of the present invention.

A rapid acceleration suppression device according to an embodiment of the present invention is described below in detail with reference to the related drawings where appropriate.

In the related drawings shown below, basically, the same reference numerals are given to members commonly used or corresponding to each other. For convenience of explanation, the member may be schematically illustrated with a size and/or a shape thereof deformed or exaggerated.

When explanation is made referring to a direction, unless otherwise noted, the direction is based on front, rear, left, right, top, and bottom, when viewed from a driver sitting in the driver's seat. More specifically, a "front-rear direction" corresponds to a "vehicle length direction"; a "left right direction", to a "vehicle width direction"; and a "top-bottom direction", to a "vehicle height direction".

<Outline of Rapid Acceleration Suppression Device 11 According to Embodiment of the Present Invention>

An outline of a rapid acceleration suppression device 11 according to an embodiment of the present invention is described with reference to FIG. 1A, FIG. 1B, FIG. 2A, FIG. 2B, FIG. 3A, and FIG. 3B, where appropriate.

Figure 1B:
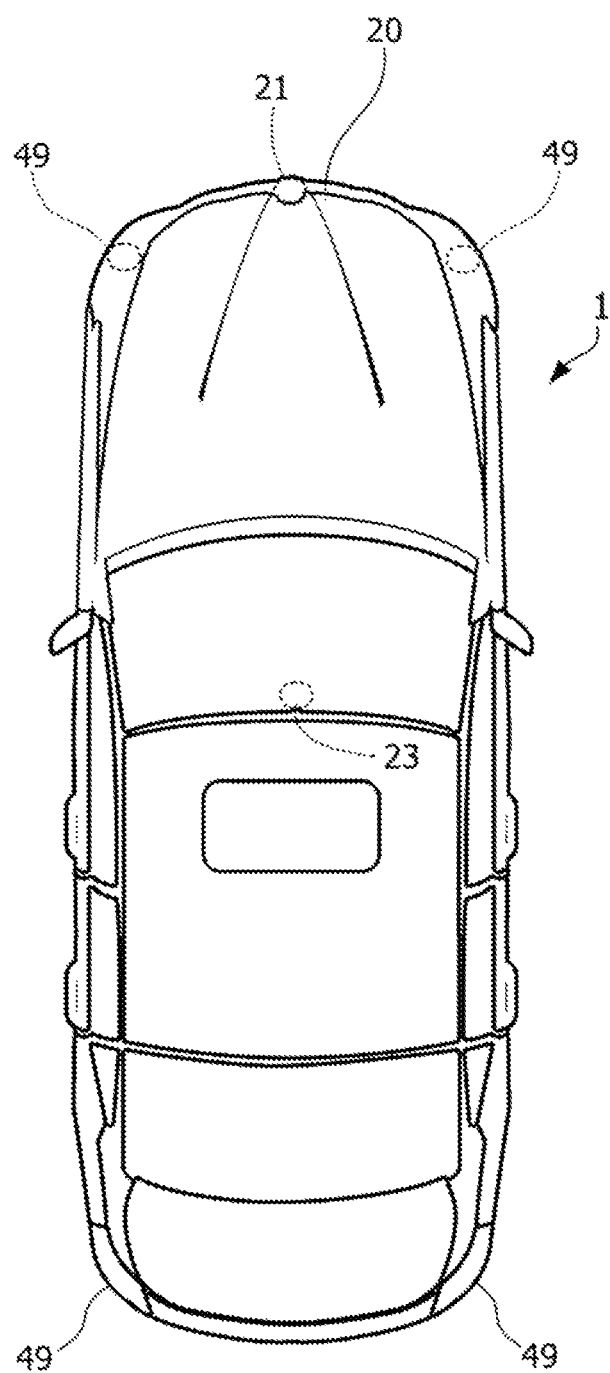
FIG. 1B is a diagram illustrating a subject vehicle equipped with the rapid acceleration suppression device, when viewed from the above.

FIG. 1A is a block configuration diagram illustrating the rapid acceleration suppression device 11 according to the embodiment of the present invention. FIG. 1B is a diagram illustrating a subject vehicle 1 equipped with the rapid acceleration suppression device 11, when viewed from the above.

Figure 2A:
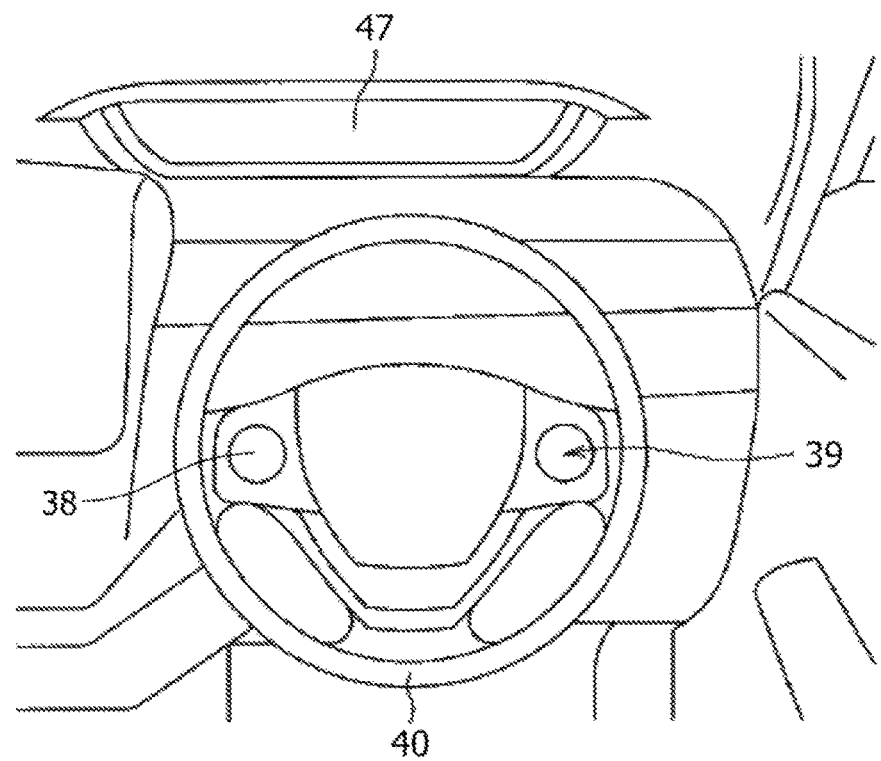
FIG. 2A is an outline diagram illustrating an operation switch of the Adaptive Cruise Control (ACC) disposed in a steering wheel.
Figure 2B:
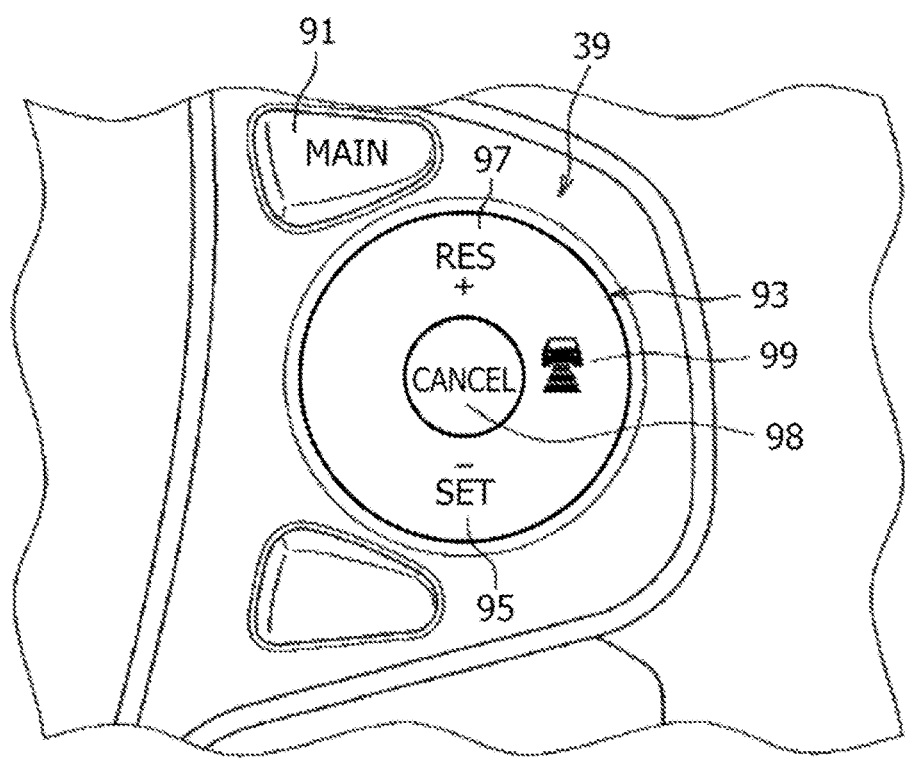
FIG. 2B is an enlarged outline diagram illustrating the operation switch of the Adaptive Cruise Control (ACC).

FIG. 2A is an outline diagram illustrating an ACC operation switch 39 of the Adaptive Cruise Control (ACC) disposed in a steering wheel 40. FIG. 2B is an enlarged outline diagram illustrating the ACC operation switch 39.

Figure 3A:
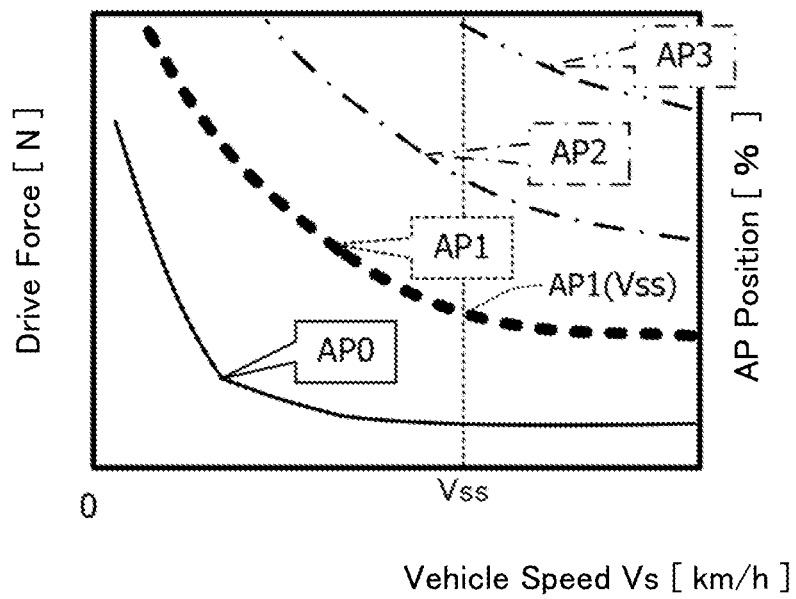
FIG. 3A is a diagram illustrating an example of a drive force characteristics map in which three characteristics, namely, a vehicle speed, an accelerator position (an AP position), and a drive force, are associated with each other, when an eco mode is set from different driving modes set to the subject vehicle.
Figure 3B:
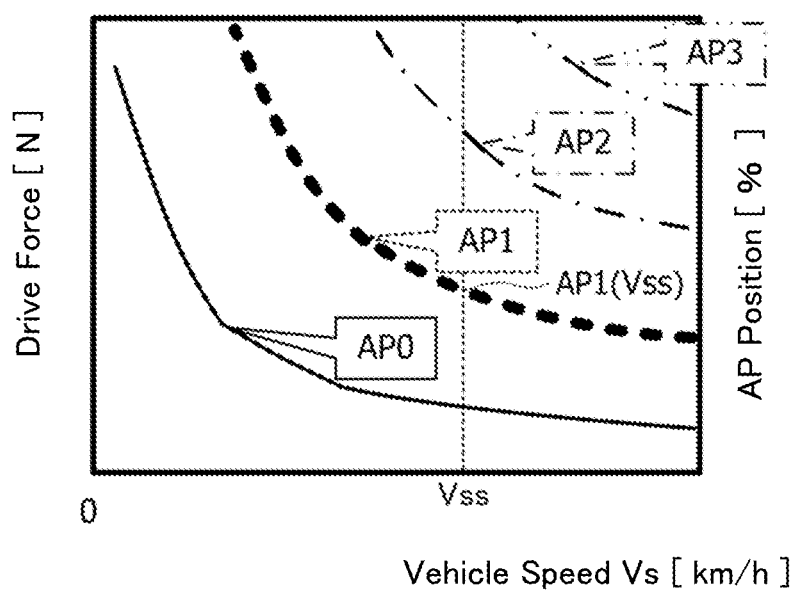
FIG. 3B is a diagram illustrating an example of a drive force characteristics map in which three characteristics, namely, the vehicle speed, the accelerator position (the AP position), and the drive force, are associated with each other, when a sport mode is set from the different driving modes set to the subject vehicle.

FIG. 3A is a diagram illustrating an example of a drive force characteristics map in which three characteristics, namely, a vehicle speed Vs, an accelerator position (an AP position) APx, and a drive force Ptr, are associated with each other, when an eco mode is set from different driving modes set to the subject vehicle 1. FIG. 3B is a diagram illustrating an example of a drive force characteristics map in which three characteristics, namely, the vehicle speed Vs, the accelerator position (the AP position) APx, and the drive force Ptr, are associated with each other, when a sport mode is set from the different driving modes set to the subject vehicle 1.

The subject vehicle 1 equipped with the rapid acceleration suppression device 11 according to the embodiment of the present invention is a vehicle not specifically limited. Herein, however, the subject vehicle 1 is assumed to be an electric-powered car in which an electric motor 75 (see FIG. 1A) for driving a wheel is mounted as a drive source.

The rapid acceleration suppression device 11 according to the embodiment of the present invention: is mounted in the subject vehicle 1, to which a plurality of driving modes of different types having respective drive force characteristics different from each other are set; and suppresses a rapid acceleration of the subject vehicle 1, caused by an abnormal operation of an accelerator pedal. When such an abnormal operation of the accelerator pedal estimated to be an erroneous depression of the accelerator pedal instead of the brake pedal is performed, the rapid acceleration suppression device 11 provides a drive force suppression control in which: a target accelerator position limit value AP LTtg is calculated, based on a drive force characteristic of a current vehicle speed Vs and a current driving mode; and the drive force Ptr perform the subject vehicle 1 is suppressed, based on the calculated target accelerator position limit value AP LTtg.

The rapid acceleration suppression device 11 according to the embodiment of the present invention also provides a deceleration control of reducing the drive force Ptr of the subject vehicle 1, when a distance Ddf between the subject vehicle 1 and a vehicle in front of the same becomes as small as a collision caution distance Ddf th.

In order to realize the above-described functions, the rapid acceleration suppression device 11 according to the embodiment includes, as illustrated in FIG. 1A, an input component 13 and an output component 15, which are data-communicably connected to each other via a communication medium 17 such as, for example, a CAN (Controller Area Network).

The input component 13 includes, as illustrated in FIG. 1A: a radar 21, a camera 23, a vehicle speed sensor 25, a wheel speed sensor 27, a brake pedal sensor 29, an accelerator pedal sensor 31, a brake fluid pressure sensor 32, a direction indicator switch 33, a tilt sensor 34, a shift position sensor 35, and a HMI (Human-Machine Interface) 37.

The output component 15 includes, as illustrated in FIG. 1A: an ACC-ECU 41, a BRK-ECU 43, a MTR-ECU 45, and a MID (Multi Information Display) 47.

The radar 21: emits radar waves to a target object including a vehicle ahead which is a vehicle travelling in front of the subject vehicle; and receives the radar waves reflected by the target object, to thereby acquire a distance to the target object or information on target object distribution including in which direction the target object is positioned. Note that the information on target object distribution may be obtained by, instead of or in addition to the radar 21, information on image in a traveling direction of the subject vehicle 1 captured by the camera 23.

The radar 21 suitably used herein includes, for example, a laser radar, a microwaves radar, a milliwaves radar, and a supersonic waves radar. As illustrated in FIG. 1B, the radar 21 is disposed on, for example, a backside of a front grill of the subject vehicle 1. The information on target object distribution acquired by the radar 21 is transmitted to the ACC-ECU 41 via the communication medium 17.

The camera 23 has an optical axis inclined forward and obliquely downward with respect to the subject vehicle 1 itself and takes an image of an area in the traveling direction thereof. The camera 23 suitably used herein includes, for example, a CMOS (Complementary Metal Oxide Semiconductor) camera and a CCD (Charge Coupled Device) camera. As illustrated in FIG. 1B, the camera 23 is disposed, for example, at an upper center of a windshield of the subject vehicle 1.

Information on image in the traveling direction of the subject vehicle 1 taken by the camera 23 is transmitted to the ACC-ECU 41 via the communication medium 17, as an image signal generated by means of, for example, interlace technology such as the NTSC (National Television Standards Committee).

The vehicle speed sensor 25 detects a vehicle speed Vs of the subject vehicle 1. Information on the vehicle speed Vs detected by the vehicle speed sensor 25 is transmitted to the ACC-ECU 41, the BRK-ECU 43, or the like, via the communication medium 17.

The wheel speed sensor 27 detects a rotational rate of each of wheels (a wheel speed) mounted to the subject vehicle 1. Information on wheel speed each detected by the wheel speed sensor 27 is transmitted to the ACC-ECU 41, the BRK-ECU 43, or the like, via the communication medium 17.

The brake pedal sensor 29 detects an amount of an operation of a brake pedal by a driver (not shown) of the subject vehicle 1 and a pedal depression torque of the brake pedal. Information on amount of the brake pedal operation and the pedal depression torque detected by the brake pedal sensor 29 is transmitted to the ACC-ECU 41, the BRK-ECU 43, or the like, via the communication medium 17.

The accelerator pedal sensor 31 detects an amount of an operation of an accelerator pedal (not shown) by the driver. Information on acceleration/deceleration operation concerning the amount of the accelerator pedal operation detected by the accelerator pedal sensor 31 is transmitted to the ACC-ECU 41, the MTR-ECU 45, or the like, via the communication medium 17.

The brake fluid pressure sensor 32 detects a brake fluid pressure in a fluid supply path in the VSA (Vehicle Stability Assist) system (not shown: "VSA" is a registered trademark of the present applicant) in a brake fluid pressure system. Information on brake fluid pressure in the fluid supply path of the VSA system detected by the brake sensor 32 is transmitted to the BRK-ECU 43 or the like, via the communication medium 17.

The direction indicator switch 33 is a switch for operating blinking of a direction indicator light which is disposed outside of the subject vehicle 1 and is used for indicating a driver's intention of turning left or right to the outside. Information on operation of turning left or right by the direction indicator switch 33 is transmitted to the ACC-ECU 41 or the like, via the communication medium 17.

The tilt sensor 34 has a function of detecting a tilt angle of each of a vehicle length direction (a longitudinal direction) and a vehicle width direction (a horizontal direction) of the subject vehicle 1. Information on tilt angle in the longitudinal direction and the horizontal direction of the subject vehicle 1 detected by the tilt sensor 34 is transmitted to the ACC-ECU 41 or the like, via the communication medium 17.

The shift position sensor 35: is disposed in, for example, a shift device (not illustrated) mounted in a center console; and has a function of detecting a shift position indicating a driver's intention of gear shifting. The shift position used herein includes, for example, a reverse (R) position, a neutral (N) position, a drive (D) position, and a brake (B) position. Operation information on shift position indicating the driver's intention of gear shifting is transmitted to the ACC-ECU 41, the MTR-ECU 45, or the like, via the communication medium 17.

The HMI (Human-Machine Interface) 37 includes a driving mode switch 38 and an operation switch of the Adaptive Cruise Control (ACC) (to be hereinafter referred to as an "ACC operation switch") 39.

The driving mode switch 38: is disposed, for example, in a steering wheel 40 (see FIG. 2A); and is used when one of a plurality of driving modes is set in line with a driver's preference for driving. The driving modes include, for example, an eco mode suited for preference for an energy-saving driving (see FIG. 3A) and a sport mode suited for preference for a brisk driving (see FIG. 3B). The sport mode is designed to have a higher responsiveness of the drive force Ptr to an operation of the accelerator pedal (an accelerator position APx), compared with the eco mode. A driver at the sport mode can enjoy a sport driving.

Information on driving mode set via the driving mode switch 38 is transmitted to the ACC-ECU 41 or the like, via the communication medium 17.

The ACC operation switch 39 is used when setting information on ACC is operated and inputted. Setting information on the ACC operated and inputted by the ACC operation switch 39 is transmitted to the ACC-ECU 41 or the like, via the communication medium 17.

The ACC operation switch 39 is disposed, for example, as illustrated in FIG. 2A, in the steering wheel 40. In vicinity of an extension of a line of sight of the driver forward in the traveling direction, a multi-information display (MID) 47 is disposed which displays the vehicle speed Vs, a shift position, and information on follow-up travel support of the ACC.

The Adaptive Cruise Control (ACC) is described next. The ACC is a function that provides control over a travel of the subject vehicle 1 such that, when a prescribed follow-up travel control condition is satisfied, the subject vehicle 1 follows and keep pace with a vehicle traveling in front thereof.

In a cruise control according to the conventional technology, when a prescribed vehicle speed Vs of the subject vehicle 1 is set in advance, the subject vehicle 1 can maintain traveling at a target vehicle speed Vtg.

By previously setting a prescribed inter-vehicular distance between the subject vehicle 1 and a vehicle running ahead in the traveling direction of the subject vehicle 1 on a travel lane on which the subject vehicle 1 is traveling (a vehicle ahead), as a target inter-vehicular distance Dtg, the Adaptive Cruise Control (ACC) makes it possible for the subject vehicle 1 to follow up the vehicle ahead, keeping the target inter-vehicular distance Dtg, while the vehicle speed Vs of the subject vehicle 1 is maintained within a range of the target vehicle speed Vtg.

In order to allow information on the ACC setting to be operated and inputted, the ACC operation switch 39 includes, as illustrated in FIG. 2B, a MAIN switch 91 and a circle menu switch 93. The MAIN switch 91 is used for activating the ACC. The circle menu switch 93 is used for operating and inputting the information on the ACC setting.

The circle menu switch 93 includes, as illustrated in FIG. 2B, a set (−SET) switch 95, a resume (RES+) switch 97, a cancel (CANCEL) switch 98, and a distance switch.

The set (−SET) switch 95 is used when the ACC is set or when the target vehicle speed Vtg is decreased, in the setting information on ACC.

The resume (RES+) switch 97 is used when the ACC is reset or when the target vehicle speed Vtg is increased, in the setting information on ACC.

The cancel (CANCEL) switch 98 is used when an activation of the ACC is canceled. The ACC activation can also be canceled by pressing down the main switch 91.

The distance switch 99 is used for setting an inter-vehicular distance between the subject vehicle 1 and a vehicle ahead. The inter-vehicular distance can be set by repetitively pressing down the distance switch 99, to thereby switch the inter-vehicular distance at, for example, four different levels such as "longest→long→moderate→small". Note that a value set as the inter-vehicular distance is designed to be changed in accordance with a high or low vehicle speed Vs of the subject vehicle 1, such that the lower the vehicle speed Vs, the smaller the value set as the inter-vehicular distance.

Referring back to FIG. 1A, the rapid acceleration suppression device 11 is further described.

The ACC-ECU 41 belonging to the output component 15 includes, as illustrated in FIG. 1A, an information acquisition part 51, a storage part 53, a determination part 55, and a control part 57.

The ACC-ECU 41 basically provides the Adaptive Cruise Control (ACC) including: constant speed travel control under which the subject vehicle 1 travels at a constant speed, based on the preset vehicle speed Vs; and a follow-up travel control under which the subject vehicle 1 travels by following up a vehicle traveling forward in the traveling direction on a travel lane on which the subject vehicle is traveling, with a prescribed inter-vehicular distance therebetween.

In other words, the ACC-ECU 41 performs the Adaptive Cruise Control (ACC) of the subject vehicle 1, including an acceleration control and a deceleration control in which: the vehicle speed Vs of the subject vehicle 1 is maintained within a range of the target vehicle speed Vtg; an inter-vehicular distance between the subject vehicle 1 and the vehicle ahead is kept at a set inter-vehicular distance; and there is no need for manipulating an accelerator pedal (not shown) or a brake pedal (not shown) by a driver of the subject vehicle 1.

When an operation of an accelerator pedal is abnormally performed which is estimated to be an erroneous depression of the accelerator pedal instead of the brake pedal, then the ACC-ECU 41 provides a drive force suppression control in which: a target accelerator position limit value AP LTtg is calculated based on the current vehicle speed Vs and a drive force characteristic corresponding to the current driving mode; and the drive force Ptr of the subject vehicle 1 is suppressed, based on the calculated target accelerator position limit value AP LTtg.

The ACC-ECU 41 is configured by a microcomputer including a CPU (Central Processing Unit), a ROM (Read Only Memory), a RAM (Random Access Memory), or the like. The microcomputer reads and executes a program or data stored in the ROM, to thereby work such that various functions of the ACC-ECU 41, including: a function of acquiring information of various types; a function of storing drive force characteristic data on drive force characteristic of each of a plurality of driving modes, different from each other; a function of determining whether or not an operation of an accelerator has been abnormally performed, based on the time-series information on accelerator position, or the like; a function of providing control such as a drive force suppression control in which a drive force of subject vehicle 1 is reduced, based on the target accelerator position limit value AP LTtg, or the like; and a function of providing ACC control of various types.

The information acquisition part 51 of the ACC-ECU 41 acquires information of various types, including: information on target object distribution detected by the radar 21; information on image taken by the camera 23 in the traveling direction of the subject vehicle 1; information on the distance Ddf between the subject 1 and an obstacle (another vehicle); information on the vehicle speed Vs detected by the vehicle speed sensor 25; time-series information on the acceleration position APx; information on turning left or right via operation by the direction indicator switch 33; information on tilt angle in the vehicle length direction and the vehicle width direction of subject vehicle 1, detected by the tilt sensor 34; operation information on shift position indicating a driver's intention of gear shifting; setting information on driving mode obtained via the driving mode switch 38; and setting information on ACC inputted via the ACC operation switch 39 of the HMI (Human-Machine Interface) 37.

The information of various types acquired by the information acquisition part 51 is transmitted to the determination part 55, the control part 57, or the like, each belonging to the ACC-ECU 41.

The storage part 53 of the ACC-ECU 41 stores therein drive force characteristics data on driving modes of a plurality of types in line with different driver's preferences for driving. Respective types of the driving modes have respective drive force characteristics different from each other. In each of the eco mode and the sports mode of the drive force characteristics data, as illustrated in FIG. 3A and FIG. 3B, respectively, a correlation between the vehicle speed Vs, the accelerator position APx, and the drive force Ptr of the subject vehicle 1 is defined.

In each of the eco mode and the sport mode in the examples of FIG. 3A and FIG. 3B, respectively, four different characteristic lines as the accelerator positions APx are drawn, namely, a fully-closed accelerator position AP0, a first accelerator position AP1, a second accelerator position AP2, and a third accelerator position AP3 (wherein, AP0<AP1<AP2<AP3).

The control part 57 references, where necessary, the drive force characteristics data (which may also be referred to as "information on drive force characteristics") on the driving modes as contents stored in the storage part 53.

The determination part 55 of the ACC-ECU 41 determines: whether or not an accelerator has been operated abnormally; and whether or not an anomaly has occurred in the vehicle speed Vs, based on the operation information on shift position and the time-series information on the accelerator position APx.

More specifically, the determination part 55 determines that the accelerator has been operated abnormally, when, for example: the shift position is in drive (D range) or in reverse (R range); the accelerator position APx exceeds a prescribed accelerator position threshold (for example, 90%); and a speed of depression of the accelerator exceeds a prescribed depression speed threshold (for example, a depression speed triple as high as normal).

The determination part 55 determines that an anomaly has occurred in the vehicle speed Vs, when, for example: when a vehicle speed value detected by the vehicle speed sensor 25 is abnormal; or when some anomaly has occurred in the communication medium 17 such as the CAN.

The determination part 55 determines: whether or not an operation of turning left or right has been performed, based on the operation information on turning left or right; whether or not a tilt angle of a road surface on which the subject vehicle is traveling exceeds a prescribed tilt angle threshold, that is, whether or not the subject vehicle 1 is traveling uphill, based on the tilt angle information on traveling road surface; whether or not an obstacle (an object) is present in the traveling direction of the subject vehicle 1, based on the shift position; and, whether or not the accelerator pedal is kept on being depressed.

A result determined by the determination part 55 is transmitted to the control part 57 of the ACC-ECU 41.

When the determination part 55 determines that the accelerator has been operated abnormally, the control part 57 of the ACC-ECU 41 provides a drive force suppression control in which the control part 57: calculates a target accelerator position limit value AP LTtg (an accelerator position value AP1 (Vs) corresponding to the current vehicle speed Vs, from among characteristics data on the accelerator position AP1), based on a prescribed characteristics data on the accelerator position AP1 corresponding to the drive force characteristic of the current vehicle speed value Vs and a current driving mode (see FIG. 3A and FIG. 3B); and suppresses the drive force Ptr of the subject vehicle 1 (to a value of the drive force Ptr corresponding to the accelerator position value AP1 (Vs)), based on the calculated target accelerator position limit value AP LTtg.

In each of the examples illustrated in FIG. 3A and FIG. 3B, "AP1" is set as a characteristics data on a prescribed accelerator position from the drive force characteristics of the current driving mode. The characteristics data on accelerator positions are set at four different levels (AP0/AP1/AP2/AP3). The "AP1" is characteristics data on the accelerator position at the lowest level, excluding "AP0" which indicates the fully-closed accelerator position.

This means that, even when the current accelerator position APx is AP2 or AP3, the drive force suppression processing is performed with an assumption that the current accelerator position APx is "AP1".

This makes it possible to suppress a rapid acceleration when an abnormal operation of the accelerator pedal has been probably performed.

When the determination part 55 determines that an anomaly has occurred in the vehicle speed Vs, the control part 57 provides a drive force suppression control in which: an accelerator position value AP1 (Vss) corresponding to a prescribed vehicle speed value Vss from a target accelerator position limit value AP LTtg (the characteristics data on accelerator position AP1) is calculated, based on the prescribed characteristics data on the accelerator position AP1 (see FIG. 3A and FIG. 3B) from the drive force characteristics of a prescribed vehicle speed value Vss (for example, a value as low as 30 km/h) and a current driving mode; and the drive force Ptr of the subject vehicle 1 is suppressed (to a value of the drive force Ptr corresponding to the accelerator position value AP1 (Vss)), based on the calculated target accelerator position limit value AP LTtg.

This means that, even when the current vehicle speed Vs exceeds the prescribed vehicle speed value Vss (Vs>Vss), an accelerator position value (AP1 (Vss)=the target accelerator position limit value AP LTtg) corresponding to the prescribed vehicle speed value Vss is calculated on an assumption that the current vehicle speed Vs is equal to Vss (Vs=Vss); and the drive force suppression processing is performed based on the calculated target accelerator position limit value AP LTtg.

This makes it possible to realize a rapid acceleration suppression based on the prescribed vehicle speed value Vss, even when an abnormal operation of the accelerator pedal has been probably performed, and, at the same time, when an anomaly has occurred in the vehicle speed Vs.

If the determination part 55 determines that an operation of turning left or right have been performed, even when an operation of the accelerator is determined to have been abnormally performed, the control part 57 terminates the drive force suppression control.

Figure 5A:
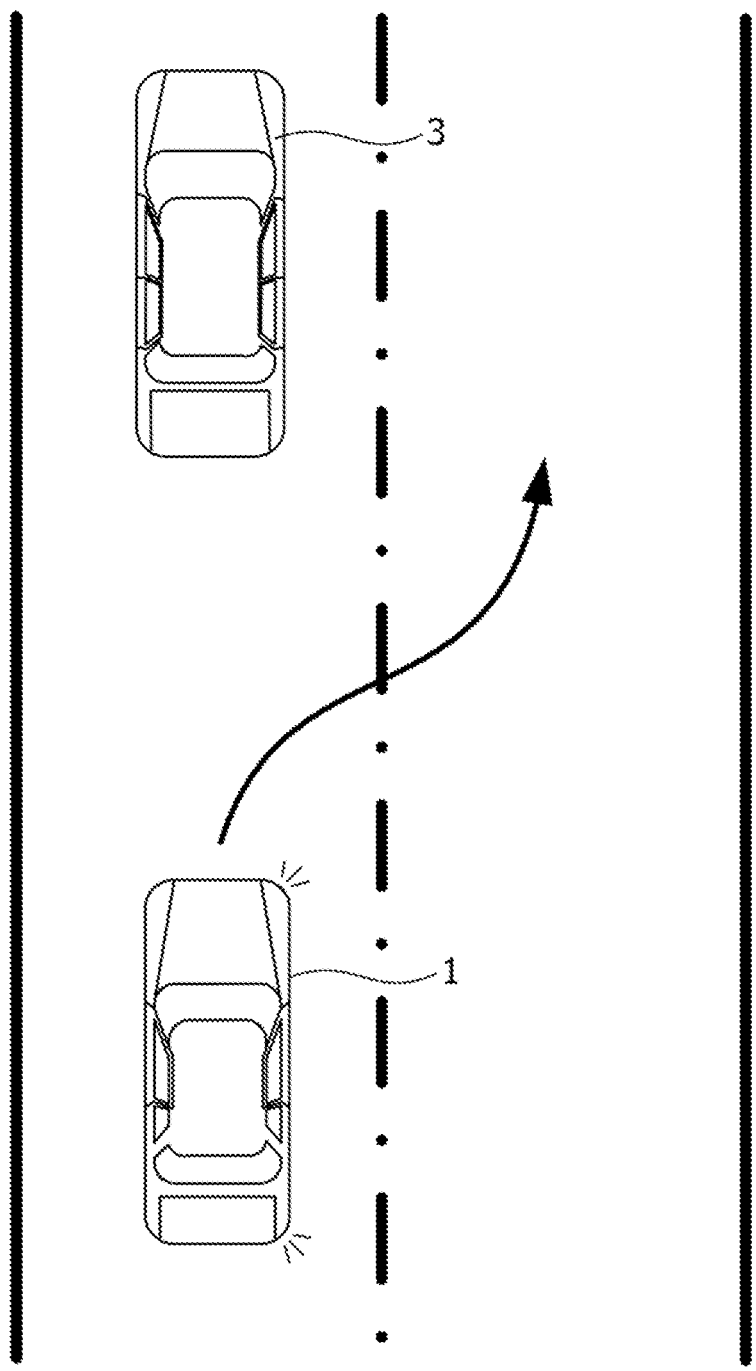
FIG. 5A is a diagram for explaining an operation performed by the rapid acceleration suppression device.

The above-described case in which the operation of the accelerator is determined to have been abnormally performed and the operation of turning left or right is determined to have been performed, is assumed to take place when, for example, the subject vehicle 1 overtakes a vehicle ahead 3 while the subject vehicle 1 is switching lanes (see FIG. 5A). In that case, a driver of the subject vehicle 1 has a reason for pressing the accelerator pedal hard (acceleration for overtaking). The control part 57 therefore terminates the drive force suppression control and provides a normal traveling control.

As described above, in the case where the subject vehicle 1 overtakes the vehicle ahead 3 while switching lanes, the drive force suppression control is terminated to return to the normal traveling control. Thus, whether or not the operation of the accelerator has been abnormally performed is properly determined, based on whether or not the operation of turning left or right is performed. This makes it possible to provide an appropriate travel control in line with a driver's intention for traveling.

If the determination part 55 determines that a tilt angle of a road surface on which the subject vehicle 1 is traveling exceeds a prescribed tilt angle threshold, even when an operation of the accelerator is determined to have been abnormally performed, the control part 57 terminates the drive force suppression control.

Figure 5B:
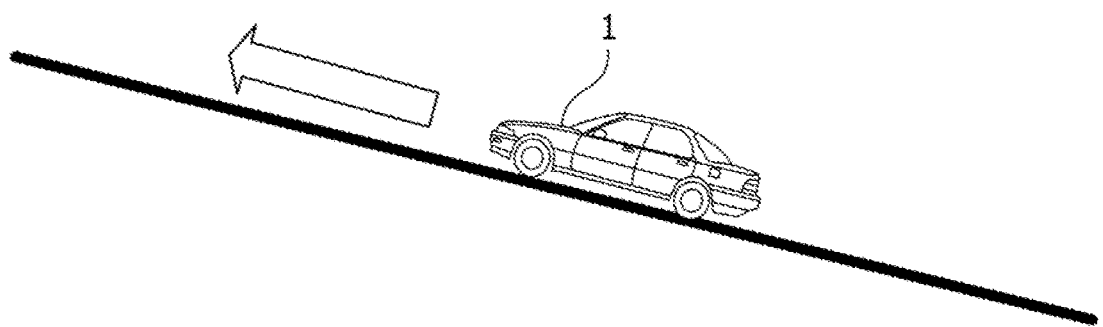
FIG. 5B is a diagram for explaining another operation performed by the rapid acceleration suppression device.

The above-described case in which the operation of the accelerator is determined to have been abnormally performed and the tilt angle of the road surface on which the subject vehicle 1 is traveling is determined to exceed the prescribed tilt angle threshold, is assumed to take place when, for example, the subject vehicle 1 is traveling uphill (see FIG. 5B). In that case, a driver of the subject vehicle 1 has a reason for pressing the accelerator pedal hard (acceleration for travelling uphill). The control part 57 therefore terminates the drive force suppression control and provides a normal traveling control.

As described above, in the case where the subject vehicle 1 is traveling uphill, the drive force suppression control is terminated to return to the normal traveling control. Thus, similarly to the case where the subject vehicle 1 overtakes the vehicle ahead 3 while switching lanes, whether or not the operation of the accelerator has been abnormally performed is properly determined. This makes it possible to provide an appropriate travel control in line with a driver's intention for traveling.

During a period in which the drive force suppression control is implemented, the control part 57 provides an acceleration/deceleration control such that a current vehicle speed Vs is maintained within a prescribed vehicle speed range (Vs−α<Vs<Vs+α).

In a case where during implementation of the drive force suppression control, the subject vehicle 1 is traveling uphill or downhill, the driver of the subject vehicle 1 is forced to conduct a prescribed accelerator/brake operation so as to maintain the current vehicle speed Vs.

Thus, in order to reduce a burden of the accelerator/brake operation, the control part 57 is configured to perform, during implementation of the drive force suppression control, the acceleration/deceleration control such that the current vehicle speed Vs is maintained within the prescribed vehicle speed range (Vs−α<Vs<Vs+α).

As described above, in the case where, during implementation of the drive force suppression control, the subject vehicle 1 is traveling uphill or downhill, the acceleration/deceleration control is provided such that the current vehicle speed Vs is maintained within the prescribed vehicle speed range (Vs−α<Vs<Vs+α). This makes it possible to, even during the implementation of the drive force suppression control, provide an appropriate traveling control in line with a driver's intention, while reducing his/her burden of driving.

If the determination part 55 determines that an obstacle (an object) is present in a traveling direction of the subject vehicle 1, based on a shift position, and if a distance Ddf between the subject vehicle 1 and the obstacle (object) becomes as small as the collision caution distance Ddf th, the control part 57 terminates the drive force suppression control and provides control over the subject vehicle 1 to decelerate or stop.

In the case as described above where an obstacle is determined to be present in the traveling direction of the subject vehicle 1 and the distance Ddf between the subject vehicle 1 and the obstacle becomes as small as the collision caution distance Ddf th, the drive force suppression control is terminated, and instead, such a control that the subject vehicle 1 is decelerated or stopped is provided. This makes it possible to prevent the subject vehicle 1 from being collided with the obstacle.

Figure 5C:
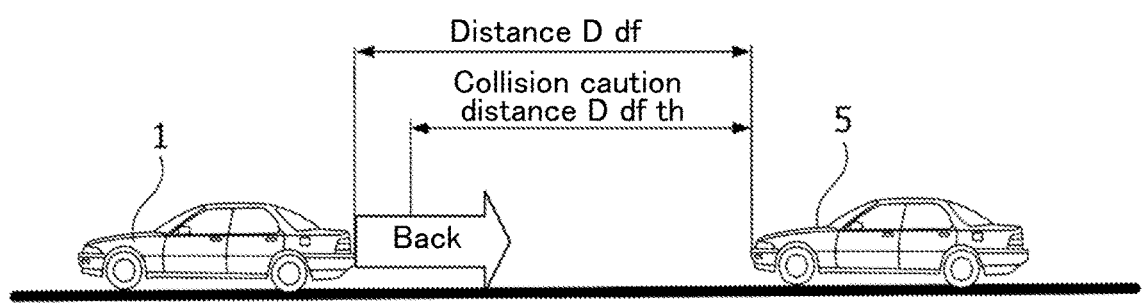
FIG. 5C is a diagram for explaining a still another operation performed by the rapid acceleration suppression device.

Let us assume a case in which: the determination part 55 determines that an obstacle (an object) is present in a backward direction of the the subject vehicle 1 based on a shift position; the obstacle is another vehicle 5; and the distance Ddf between the subject vehicle 1 and another vehicle 5 becomes as small as the collision caution distance Ddf th (see FIG. 5C). In that case, the control part 57 provides such control that: a MID 47 (an alarm) calls a driver's attention; and a hazard flasher 49 blinks for a prescribed time period in a way different from that at normal times.

This makes it possible to: prevent the subject vehicle 1 from being collided with the obstacle; and draw attentions of drivers of the subject vehicle 1 and another vehicle 5 to a possible risk for a collision.

The BRK-ECU 43 belongs to the output component 15, as the ACC-ECU 41 does. The BRK-ECU 43 includes, as illustrated in FIG. 1A, the information acquisition part 61 and a brake control part 63.

The BRK-ECU 43 operates a motor cylinder device (for example, see Japanese Laid-Open Patent Application, Publication No. 2015-110378) by driving a brake motor 67, in accordance with a level of a brake fluid pressure (a primary fluid pressure) generated at a master cylinder (not shown) in response to a brake operation by the driver of the subject vehicle 1, to thereby generate another brake fluid pressure (a secondary fluid pressure) in order to put a brake on the subject vehicle 1.

The BRK-ECU 43 drives, for example, a pressure pump (not shown) using a pump motor 69, upon receipt of a deceleration control instruction transmitted from the control part 57 of the ACC-ECU 41, to thereby control a braking force of each of four wheels in accordance with a target fluid pressure of each of the four wheels.

The BRK-ECU 43 is configured by a microcomputer including a CPU (Central Processing Unit), a ROM (Read Only Memory), a RAM (Random Access Memory), or the like. The microcomputer reads and executes a program or data stored in the ROM, to thereby work such that various functions of the BRK-ECU 43 are executed and controlled, including a function of acquiring information of various types and a function of brake controlling based on a brake operation or an ACC activation.

The BRK-ECU 43 may also be referred to as part of a "control part".

The information acquisition part 61 acquires information of various types including: information on the vehicle speed Vs detected by the vehicle speed sensor 25; information on vehicle wheel speed of each of wheels detected by the wheel speed sensor 27; information on the amount of the brake pedal operation and the pedal depression torque detected by the brake pedal sensor 29; information on fluid pressure in a fluid supply path in the VSA system detected by the brake fluid pressure sensor 32; and a deceleration control instruction transmitted from the control part 57 of the ACC-ECU 41.

The brake control part 63 provides a brake control over the subject vehicle 1 by operating the motor cylinder device by the driving the brake motor 67, based on information on brake operation by a driver acquired via the brake pedal sensor 29 or a deceleration control instruction transmitted from the control part 57 of the ACC-ECU 41. The brake control part 65 also drives a pressure pump using the pump motor 69 where necessary, to thereby control a braking force of each of the four wheels in accordance with a target fluid pressure of each of the four wheels.

The MTR-ECU 45 belongs to the output component 15, as the ACC-ECU 41 and the BRK-ECU 43 do. The MTR-ECU 45 includes, as illustrated in FIG. 1A, an information acquisition part 71 and a driving control part 73.

The MTR-ECU 45 drives and controls the electric motor 75 for driving a wheel, based on: information on acceleration operation (an amount of accelerator pedal depression) by a driver acquired via the accelerator pedal sensor 31; or the brake control information transmitted from the control part 57 of the ACC-ECU 41.

The MTR-ECU 45 is configured by a microcomputer including a CPU (Central Processing Unit), a ROM (Read Only Memory), a RAM (Random Access Memory), or the like. The microcomputer reads and executes a program or data stored in the ROM, to thereby work such that various functions of the MTR-ECU 45 are executed and controlled, including a function of acquiring information of various types and a function of driving and controlling the electric motor 75.

The MTR-ECU 45 may also be referred to as part of the "control part".

The information acquisition part 71 acquires information of various types including: the information on acceleration/deceleration operation concerning an amount of an accelerator pedal operation detected by the accelerator pedal sensor 31; and the acceleration/deceleration control instruction transmitted from the control part 57 of the ACC-ECU 41.

The driving control part 73 drives and controls the electric motor 75, based on the information on acceleration operation (an amount of accelerator pedal depression) by the driver acquired via the accelerator pedal sensor 31, or the acceleration/deceleration control instruction transmitted from the control part 57 of the ACC-ECU 41.

<Operations Performed by Rapid Acceleration Suppression Device 11 According to Embodiment of the Present Invention>

Next are described operations performed by the rapid acceleration suppression device 11 according to the embodiment of the present invention, with reference to FIG. 4A, FIG. 4B, FIG. 5A, and FIG. 5B where appropriate.

Figure 4A:
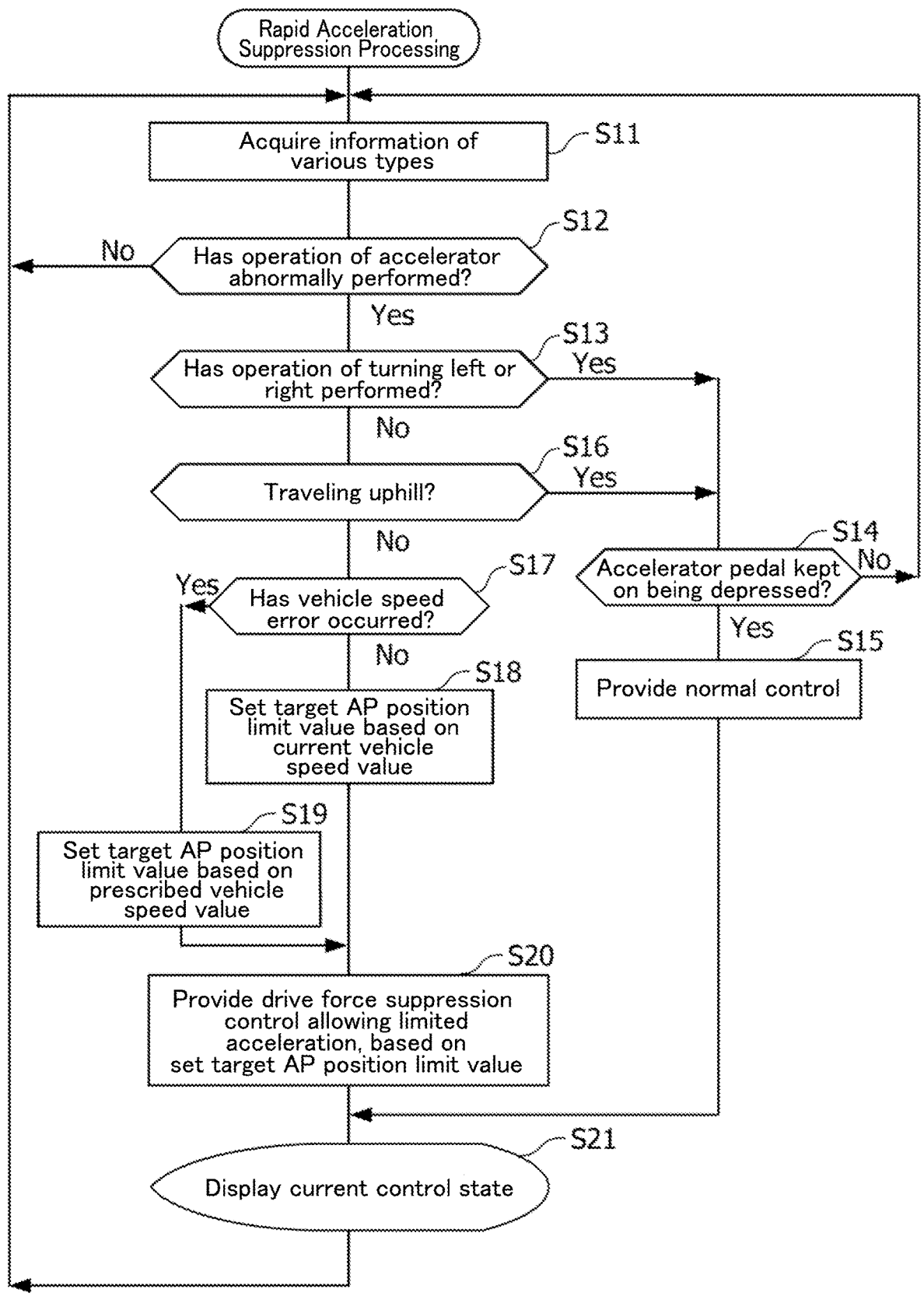
FIG. 4A is a flowchart for explaining operations performed by the rapid acceleration suppression device according to the embodiment of the present invention.
Figure 4B:
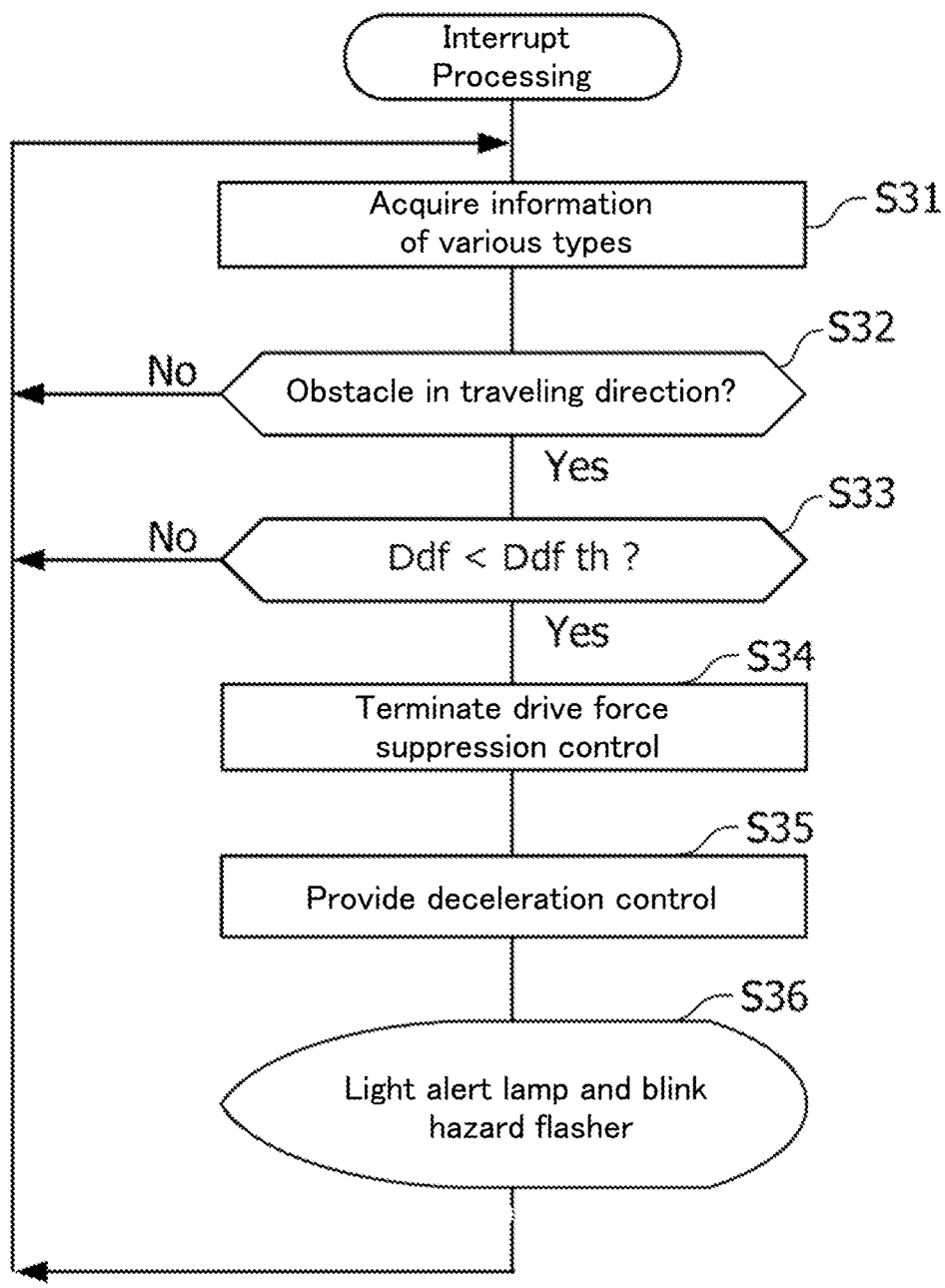
FIG. 4B is a flowchart for explaining an interrupt processing as one of the operations performed by the rapid acceleration suppression device.

FIG. 4A is a flowchart for explaining operations performed by the rapid acceleration suppression device 11 according to the embodiment of the present invention. FIG. 4B is a flowchart for explaining an interrupt processing as one of the operations performed by the rapid acceleration suppression device 11 according to the embodiment of the present invention. FIG. 5A to FIG. 5C are each a diagram for explaining an operation performed by the rapid acceleration suppression device 11 according to the embodiment of the present invention.

Description is herein made assuming that: the driving mode is set to the eco mode (see FIG. 3A); and "AP1" as characteristics data on the first accelerator position is set as characteristics data on a prescribed accelerator position from among drive force characteristics of the current driving mode (the eco mode).

In step S11 illustrated in FIG. 4A, the information acquisition part 51 of the ACC-ECU 41 acquires information of various types including: information on distribution of an object detected by the radar 21; information on image taken by the camera 23 in the traveling direction of the subject vehicle 1; information on the distance Ddf between the subject vehicle 1 and another vehicle (an obstacle); information on the vehicle speed Vs detected by the vehicle speed sensor 25; time-series information on the accelerator position APx; information on the direction indicator switch 33 concerning turning left or right; information on tilt angle in the vehicle length and width directions of the subject vehicle 1 detected by the tilt sensor 34; operation information on shift position indicating a driver's intention of gear shifting; setting information on driving mode via the driving mode switch 38; and setting information on ACC inputted via the ACC operation switch 39 of the HMI 37 (including information on follow-up traveling control intention).

In step S12, the determination part 55 of the ACC-ECU 41 determines whether or not an operation of the accelerator has been abnormally performed, based on the operation information on shift position and the time-series information on the accelerator position APx.

As a result determined in step S12, if the operation of the accelerator is not determined to have been abnormally performed (if No in step S12), the ACC-ECU 41 returns the processing to step S11 and proceeds with step S11 and subsequent ones.

Meanwhile, as the result determined in step S12, if the operation of the accelerator is determined to have been abnormally performed (if Yes in step S12), the ACC-ECU 41 advances the processing to step S13.

In step S13, the determination part 55 of the ACC-ECU 41 determines whether or not an operation of turning left or right has been performed.

As a result determined in step S13, if the operation of turning left or right is not determined to have been performed (if No in step S13), the ACC-ECU 41 jumps the processing to step S16.

Meanwhile, as the result determined in step S13, if the operation of turning left or right is determined to have been performed (if Yes in step S13), the ACC-ECU 41 advances the processing to step S14.

In step S14, the determination part 55 of the ACC-ECU 41 determines whether or not an accelerator pedal is kept on being depressed.

As a result determined in step S14, if the accelerator pedal is not determined to be kept on being depressed (if No in step S14), the ACC-ECU 41 returns the processing to step S11 and proceeds with step S11 and subsequent ones.

Meanwhile, as the result determined in step S14, if the accelerator pedal is determined to be kept on being depressed (if Yes in step S14), the ACC-ECU 41 advances the processing to step S15.

In step S15, the control part 57 of the ACC-ECU 41 provides a normal control without suppression of the drive force. The ACC-ECU 41 then jumps the processing to step S21.

In step S16, the determination part 55 of the ACC-ECU 41 determines whether or not the subject vehicle 1 is traveling uphill.

As a result determined in step S16, if the subject vehicle 1 is determined to be traveling uphill (if Yes in step S14), the ACC-ECU 41 returns the processing to step S14 and proceeds with step S14 and subsequent ones.

Meanwhile, as the result determined in step S16, if the subject vehicle 1 is not determined to be traveling uphill (if No in step S16), the ACC-ECU 41 advances the processing to step S17.

In step S17, the determination part 55 of the ACC-ECU 41 determines whether or not an anomaly has been detected in the vehicle speed Vs, that is, whether or not a vehicle speed error has occurred.

As a result determined in step S17, if a vehicle speed error is not determined to have occurred (if No in step S17), the ACC-ECU 41 advances the processing to step S18.

Meanwhile, as the result determined in step S17, if a vehicle speed error is determined to have occurred (if Yes in step S17), the ACC-ECU 41 jumps the processing to step S19.

In step S18, the control part 57 of the ACC-ECU 41 sets (calculates) a target accelerator position limit value (a target AP position limit value) AP LTtg corresponding to the current vehicle speed value Vs, based on the prescribed characteristics data on the accelerator position AP1 (see FIG. 3A) of the drive force characteristics of the current vehicle speed value Vs and the current driving mode.

More specifically, the control part 57 sets (calculates), as illustrated in FIG. 3A, the accelerator position value AP1 (Vs) corresponding to the current vehicle speed value Vs from the characteristics data on the accelerator position AP1, as the target accelerator position limit value AP LTtg.

Meanwhile, in step S19, the control part 57 of the ACC-ECU 41 sets (calculates) the target accelerator position limit value AP LTtg corresponding to the prescribed vehicle speed value Vss, based on the characteristics data on the accelerator position AP1 (see FIG. 3A) from the drive force characteristics of the prescribed vehicle speed value Vss and the current driving mode.

More specifically, the control part 57 sets (calculates), as illustrated in FIG. 3A, the accelerator position value AP1 (Vss) corresponding to the prescribed vehicle speed value Vss from the characteristics data on the accelerator position AP1, as the target accelerator position limit value AP LTtg.

In step S20, the control part 57 of the ACC-ECU 41 provides a drive force suppression control in which a limited acceleration is allowed, based on the target accelerator position limit value (target AP position limit value) AP LTtg set (calculated) in step S18 or in step S19.

More specifically, the control part 57 provides the drive force suppression control in which the drive force Ptr of the subject vehicle 1 is suppressed (to a value of the drive force Ptr corresponding to the accelerator position value AP1 (Vs)), based on the target accelerator position limit value AP LTtg set (calculated) in step S18.

The control part 57 also provides the drive force suppression control in which the drive force Ptr of the subject vehicle 1 is suppressed (to a value of the drive force Ptr corresponding to the accelerator position value AP1 (Vss)), based on the target accelerator position limit value AP LTtg set (calculated) in step S19.

In step S21, the control part 57 of the ACC-ECU 41 provides control such that a state of a current control is displayed using the MID 47 (alarm) and the hazard flasher 49.

The ACC-ECU 41 then returns the processing to step S11 and proceeds with step S11 and subsequent ones.

Next is described a flow of an interrupt processing as one of the operations performed by the rapid acceleration suppression device 11 according to the embodiment of the present invention, with reference to FIG. 4B.

The interrupt processing illustrated in FIG. 4B is performed in parallel to the rapid acceleration suppression processing illustrated in FIG. 4A.

In step S31 illustrated in FIG. 4B, the information acquisition part 51 of the ACC-ECU 41 acquires information of various types similar to that acquired in step S11 illustrated in FIG. 4A.

In step S32, the determination part 55 of the ACC-ECU 41 determines whether or not there is an obstacle (including another vehicle) in the traveling direction of the subject vehicle 1.

As a result determined in step S32, if it is not determined that there is an obstacle in the traveling direction of the subject vehicle 1 (if No in step S32), the ACC-ECU 41 returns the processing to step S31 and proceeds with step S31 and subsequent ones.

Meanwhile, as the result determined in step S32, if it is determined that there is an obstacle in the traveling direction of the subject vehicle 1 (if Yes in step S32), the ACC-ECU 41 advances the processing to step S33.

In step S33, the determination part 55 of the ACC-ECU 41 determines whether or not the subject vehicle 1 is approaching the obstacle such that the distance Ddf between the subject vehicle 1 and the obstacle becomes as small as the collision caution distance Ddf th (Ddf<Ddf th?).

As a result determined in step S33, if the distance Ddf between the subject vehicle 1 and the obstacle (another vehicle 5) is not determined to become as small as the collision caution distance Ddf th (see FIG. 5C) (if No in step S33), the ACC-ECU 41 returns the processing to step S31 and proceeds with step S31 and subsequent ones.

Meanwhile, as the result determined in step S33, if the distance Ddf between the subject vehicle 1 and the obstacle (another vehicle 5) is determined to become as small as the collision caution distance Ddf th (if Yes in step S33), the ACC-ECU 41 advances the processing to step S34.

In steps S34 to S35, the control part 57 of the ACC-ECU 41: performs the interrupt processing with respect to the rapid acceleration suppression processing illustrated in FIG. 4A; thereby terminates the drive force suppression control; and provides a deceleration control over the subject vehicle 1.

In step S36, the control part 57 of the ACC-ECU 41: lights an alert lamp using the MID 47 (alarm); and blinks the hazard flasher 49 at prescribed time intervals.

Then, the ACC-ECU 41 returns the processing to step S31 and proceeds with step S31 and subsequent ones.

<Actions and Advantageous Effects Obtained by Rapid Acceleration Suppression Device 11 According to Embodiment of the Present Invention>

Next are described actions and advantageous effects obtained by the rapid acceleration suppression device 11 according to the embodiment of the present invention.

In a first aspect of the present invention, the rapid acceleration suppression device 11 provide a rapid acceleration suppression control in which a rapid acceleration of the subject vehicle 1 caused by an abnormal operation of an accelerator pedal is suppressed.

The rapid acceleration suppression device 11 includes: the information acquisition part 51 configured to acquire information on the vehicle speed Vs and time-series information on the accelerator position APx; the determination part 55 configured to determine whether or not the accelerator has been performed abnormally, based on the time-series information on the accelerator position APx; and the control part 57 configured to provide control over the drive force Ptr of the subject vehicle 1, based on the current vehicle speed Vs and the current accelerator position APx.

If the determination part 55 determines that the accelerator has been performed abnormally, the control part 57 allows acceleration of the subject vehicle 1 within a range within which the current vehicle speed Vs does not exceed a preset upper limit vehicle speed (for example, 30 km/h).

The configuration above makes it possible to provide the rapid acceleration suppression control in which an acceleration is allowed within the range within which the current vehicle speed Vs does not exceed the preset upper limit vehicle speed.

As described above, in the first aspect of the present invention, the rapid acceleration suppression device 11 provides the rapid acceleration suppression control in which an acceleration is allowed within the range within which the current vehicle speed Vs does not exceed the preset upper limit vehicle speed. This makes it possible to realize the rapid acceleration suppression control under which smooth travelling and safety of the vehicle can be achieved in a compatible manner.

As a result, such an advantageous effect of increasing occupant comfort inside the subject vehicle 1 can be obtained.

In a second aspect of the present invention, the rapid acceleration suppression device 11: is mounted in the subject vehicle 1 to which a plurality of driving modes of types different from each other is set, the plurality of driving modes having drive force characteristics different from each other; and that suppresses a rapid acceleration of the subject vehicle 1 caused by an abnormal operation of the accelerator.

The rapid acceleration suppression device 11 includes: the information acquisition part 51 configured to acquire information on the vehicle speed Vs, time-series information on the accelerator position APx, and information on drive force characteristics with respect to a current driving mode; the determination part 55 configured to determine whether or not an accelerator has been performed abnormally, based on the time-series information on the accelerator position APx; and the control part 57 configured to provide control over the drive force Ptr of the subject vehicle 1, based on the current vehicle speed Vs and the current accelerator position APx.

If the determination part 55 determines that the accelerator has been performed abnormally, the control part 57 provides a drive force suppression control in which: a target accelerator position limit value AP LTtg is calculated, based on the information on drive force characteristics corresponding to the current vehicle speed Vs and the current driving mode; and the drive force Ptr of the subject vehicle 1 is suppressed, based on the calculated target accelerator position limit value AP LTtg.

In the second aspect of the present invention, the information acquisition part 51 of the rapid acceleration suppression device 11 acquires: the information on the vehicle speed Vs, the time-series information on the accelerator position APx, and the information on drive force characteristics with respect to the current driving mode. The determination part 55 determines whether or not the accelerator has been performed abnormally, based on the time-series information on the accelerator position APx. The control part 57 suppresses the drive force Ptr of the subject vehicle 1, based on the current vehicle speed Vs and the current accelerator position APx.

In particular, if the determination part 55 determines that the accelerator has been performed abnormally, the control part 57 provides a drive force suppression control in which: a target accelerator position limit value (a target AP position limit value) AP LTtg is calculated, based on the information on drive force characteristics corresponding to the current vehicle speed Vs and the current driving mode; and the drive force Ptr of the subject vehicle 1 is suppressed, based on the calculated target accelerator position limit value AP LTtg.

This makes it possible to provide the drive force suppression control under which the current vehicle speed Vs and the current-selected type of the driving mode are taken into account.

Note that the function of providing the rapid acceleration suppression control in which a rapid acceleration is allowed within a range within which the current vehicle speed Vs does not exceed the upper limit vehicle speed, of the rapid acceleration suppression device 11 in the first aspect may be applied to the rapid acceleration suppression device 11 in the second aspect.

In the second aspect of the present invention, the rapid acceleration suppression device 11 provides the drive force suppression control in which the current vehicle speed Vs and the current-selected type of the driving mode are taken into account. This makes it possible to realize the drive force suppression control without giving a driver of the subject vehicle 1 a feeling of strangeness, even when the drive force suppression technique is applied to the subject vehicle 1 to which a plurality of driving modes of different types having respective drive force characteristic different from each other are set.

As a result, such an advantageous effect of increasing occupant comfort inside the subject vehicle 1 can be obtained.

In a third aspect of the present invention, the rapid acceleration suppression device 11 is that in the second aspect. A correlation between the vehicle speed Vs, the accelerator position APx, and the drive force Ptr of the subject vehicle 1 is defined in each of the drive force characteristics of the respective driving modes of a plurality of types. The determination part is further configured to determine whether or not an anomaly has occurred in the vehicle speed Vs. If the determination part 55 determines that an anomaly has occurred in the vehicle speed Vs, the control part 57 provides a drive force suppression control in which: a target accelerator position limit value (a target AP position limit value) AP LTtg is calculated, based on characteristics data on the prescribed accelerator position AP1 from the drive force characteristics corresponding to a prescribed vehicle speed value Vss and a current driving mode; and the drive force Ptr of the subject vehicle 1 is suppressed based on the calculated target accelerator position limit value AP LTtg.

In the rapid acceleration suppression device 11 of the third aspect, as described above, the determination part 55 determines whether or not an anomaly has occurred in the vehicle speed Vs. If the determination part 55 determines that an anomaly has occurred in the vehicle speed Vs, the control part 57 provides a drive force suppression control in which: the target accelerator position limit value (the target AP position limit value) AP LTtg is calculated, based on characteristics data on the prescribed accelerator position AP1 from the drive force characteristics corresponding to the prescribed vehicle speed value Vss and the current driving mode; and the drive force Ptr of the subject vehicle 1 is suppressed based on the calculated target accelerator position limit value AP LTtg.

That is, even when the current vehicle speed Vs exceeds the prescribed vehicle speed value Vss (Vs>Vss), the rapid acceleration suppression device 11 in the third aspect determines that the current vehicle speed Vs is equal to the prescribed vehicle speed value Vss (Vs=Vss), based on which the rapid acceleration suppression device 11: calculates an accelerator position value (AP1 (Vss)=target accelerator position limit value AP LTtg); and performs the drive force suppression processing, based on the calculated target accelerator position limit value AP LTtg.

This makes it possible to realize a rapid acceleration suppression, based on the prescribed vehicle speed value Vss, even when an abnormal operation of the accelerator pedal has been probably performed, and, at the same time, when an anomaly has occurred in the vehicle speed Vs.

In the third aspect of the present invention, even when the current vehicle speed Vs exceeds the prescribed vehicle speed value Vss (Vs>Vss), the rapid acceleration suppression device 11 in the third aspect determines that the current vehicle speed Vs is equal to the prescribed vehicle speed value Vss (Vs=Vss), based on which the rapid acceleration suppression device 11: calculates the accelerator position value (AP1 (Vss)=target accelerator position limit value AP LTtg); and performs the drive force suppression processing, based on the calculated target accelerator position limit value AP LTtg. This makes it possible to realize the rapid acceleration suppression, based on the prescribed vehicle speed value Vss, even when an abnormal operation of the accelerator pedal has been probably performed, and, at the same time, when an anomaly has occurred in the vehicle speed Vs.

In a fourth aspect of the present invention, the rapid acceleration suppression device 11 is that of the second or the third aspect.

The information acquisition part 51 is further configured to acquire operation information on turning left or right. The determination part 55 is further configured to determine whether or not an operation of turning left or right has been performed, based on the operation information on turning left or right. If the determination part 55 determines that the operation of turning left or right has been performed, the control part 57 terminates the drive force suppression control.

The rapid acceleration suppression device 11 in the fourth aspect is directed to a case in which the operation of the accelerator is determined to have been abnormally performed and the operation of turning left or right is determined to have been performed. The case is assumed to take place when, for example, the subject vehicle 1 overtakes a vehicle ahead 3 while the subject vehicle 1 is switching lanes (see FIG. 5A).

In that case, a driver of the subject vehicle 1 has a good reason for pressing the accelerator pedal hard (an abnormal operation) (acceleration for overtaking). The control part 57 is configured to terminate the drive force suppression control and provide a normal traveling control.

In the fourth aspect of the present invention, as in the case where the subject vehicle 1 overtakes a vehicle ahead while changing lanes, if an abrupt depression of the accelerator pedal (an abnormal operation) has a good reason (acceleration for overtaking), the rapid acceleration suppression device 11 terminates the drive force suppression control and provide a traveling control at normal times. This makes it possible to properly determine whether or not the operation of the accelerator has been abnormally performed, based on whether or not the operation of turning left or right is performed and to provide an appropriate travel control in line with a driver's intention for traveling.

In a fifth aspect of the present invention, the rapid acceleration suppression device 11 is that in the second or the third aspect. The information acquisition part 51 is further configured to acquire information on tilt angle of a road surface on which the subject vehicle is traveling. The determination part 55 is further configured to determine whether or not a tilt angle on the road surface exceeds a prescribed tilt angle threshold, based on the information on tilt angle of the road surface. If the determination part 55 determines that the tilt angle on the road surface exceeds the prescribed tilt angle threshold, the control part 57 terminates the drive force suppression control.

The rapid acceleration suppression device 11 in the fifth aspect is directed to a case in which the operation of the accelerator is determined to have been abnormally performed and the tilt angle on the road surface on which the subject vehicle 1 is traveling exceeds the prescribed tilt angle threshold. The case is assumed to take place when, for example, the subject vehicle 1 is traveling uphill (see FIG. 5B).

In that case, the driver of the subject vehicle 1 has a reason for pressing the accelerator pedal hard (an abnormal operation) (acceleration for traveling uphill). The control part 57 is thus configured to terminate the drive force suppression control and provide a normal traveling control.

In the fifth aspect of the present invention, as in the case where the subject vehicle 1 is traveling uphill, if an abrupt depression of the accelerator pedal (an abnormal operation) has a good reason (acceleration for traveling uphill), the rapid acceleration suppression device 11 terminates the drive force suppression control and provide a traveling control at normal times. This makes it possible to properly determine whether or not the operation of the accelerator has been abnormally performed, based on a tilt state on the road surface and to provide an appropriate travel control in line with a driver's intention for traveling.

In a sixth aspect of the present invention, the rapid acceleration suppression device 11 is that in the second aspect. The control part 59 is configured to provide an acceleration/deceleration control such that the current vehicle speed Vs is maintained within a prescribed vehicle speed range (Vs−α<Vs<Vs+α), during implementation of the drive force suppression control.

In a case where during implementation of the drive force suppression control, the subject vehicle 1 is traveling uphill or downhill, the driver of the subject vehicle 1 is forced to conduct a prescribed accelerator/brake operation so as to maintain the current vehicle speed Vs.

Thus, in the rapid acceleration suppression device 11 of the sixth aspect, in order to reduce a burden of the accelerator/brake operation, the control part 57 is configured to perform, during implementation of the drive force suppression control, the acceleration/deceleration control such that the current vehicle speed Vs is maintained within the prescribed vehicle speed range (Vs−α<Vs<Vs+α).

In the rapid acceleration suppression device 11 of the sixth aspect, in the case where, during implementation of the drive force suppression control, the subject vehicle 1 is traveling uphill or downhill, the acceleration/deceleration control is provided such that the current vehicle speed Vs is maintained within the prescribed vehicle speed range (Vs−α<Vs<Vs+α). This makes it possible to, even during the implementation of the drive force suppression control, provide an appropriate traveling control in line with a driver's intention, while reducing his/her burden of driving.

In a seventh aspect of the present invention, the rapid acceleration suppression device 11 is that in the first or the second aspect. The information acquisition part 51 is further configured to acquire information on shift position and information on object around the subject vehicle 1 is further configured to determine whether or not an object is present in the travel direction of the subject vehicle 1 based on the shift position. If the determination part 55 determines that an object is present in the travel direction of the subject vehicle 1 based on the shift position, the control part 57 provides control such that th subject vehicle 1 is decelerated or stopped, irrespective of an operation of the accelerator.

In the rapid acceleration suppression device 11 in the seventh aspect, if the determination part 55 determines that an object is present in the travel direction of the subject vehicle 1 based on the shift position, the control part 57 provides control such that th subject vehicle 1 is decelerated or stopped, irrespective of an operation of the accelerator. This makes it possible to prevent the subject vehicle 1 from being collided with the obstacle (object).

In an eighth aspect of the present invention, the rapid acceleration suppression device 11 is that in the seventh aspect. If the determination part determines that an obstacle (an object) is present in the travel direction of the subject vehicle 1 based on the shift position, and also if a distance Ddf between the subject vehicle 1 and the obstacle (object) becomes as small as a collision caution distance Ddf th, the control part 57 terminates the drive force suppression control and provides a control such that the subject vehicle 1 is decelerated or stopped.

In the rapid acceleration suppression device 11 in the eighth aspect, if the determination part 55 determines that an obstacle (an object) is present in the travel direction of the subject vehicle 1 based on the shift position, and also if the distance Ddf between the subject vehicle 1 and the obstacle (object) becomes as small as the collision caution distance Ddf th, the control part 57 terminates the drive force suppression control and provides a control such that the subject vehicle 1 is decelerated or stopped. This makes it possible to prevent the subject vehicle 1 from being collided with the obstacle (object).

In a ninth aspect of the present invention, the rapid acceleration suppression device 11 is that in the seventh aspect. The rapid acceleration suppression device 11 further includes: the MID (an alarm) disposed inside the subject vehicle; and the hazard flasher 49 disposed outside the subject vehicle 1. If the determination part 55 determines that an obstacle (an object) is present in a backward direction of the the subject vehicle 1 based on a shift position, if the obstacle (object) is another vehicle 5, and if the distance Ddf between the subject vehicle 1 and another vehicle 5 becomes as small as the collision caution distance Ddf th, then the control part 57 provides control such that the MID (alarm) 47 calls a driver's attention and that the hazard flasher 49 blinks for a prescribed time period in a way different from that at normal times.

In the ninth aspect of the present invention, the rapid acceleration suppression device 11 can prevent the subject vehicle 1 from being collided with another vehicle 5 and can draw attentions of drivers of the subject vehicle 1 and another vehicle 5 to a risk for a possible collision.

<Other Embodiments>

A plurality of the embodiments explained above are given as examples for realizing the present invention. A technical scope of the present invention should not be thus interpreted by those examples in a limited manner. The present invention can be carried out in various forms without departing from the gist and major features thereof.

In explaining the embodiment of the present invention, for example, the configuration is exemplified in which a part performing the drive force suppression control function of the present invention is disposed in the ACC-ECU 41. The present invention is not, however, limited to this. Another configuration can be used in which the part performing the drive force suppression control function of the present invention is disposed in an ECU which is independently provided from the ACC-ECU 41.

In explaining the embodiment of the present invention, an electric-powered car equipped with the electric motor 75 as a drive source of the subject vehicle 1 is exemplified. The present invention is not, however, limited to this. The present invention can also be applied to a vehicle equipped with an internal combustion engine as the drive source and a hybrid automobile such as a HEV (Hybrid Electric Vehicle).

DESCRIPTION OF REFERENCE NUMERALS

1 subject vehicle
3 vehicle ahead
5 another vehicle
11 rapid acceleration suppression device
41 ACC-ECU
43 BRK-ECU
45 MTR-ECU
51 information acquisition part
53 storage part
55 determination part
57 control part
AP LTtg target accelerator position limit value (target AP position limit value)
Ddf distance
Ddf th collision caution distance
Vs vehicle speed
Vss prescribed vehicle speed value

The invention claimed is:

1. A rapid acceleration suppression device of a subject vehicle, wherein
the rapid acceleration suppression device is mounted in the subject vehicle to which a plurality of driving modes of types different from each other is set, the plurality of driving modes having drive force characteristics different from each other,
the rapid acceleration suppression device provides a rapid acceleration suppression control over the subject vehicle such that a rapid acceleration thereof caused by an abnormal operation of an accelerator is suppressed,
the rapid acceleration suppression device comprises:
an information acquisition part configured to acquire information on vehicle speed, time-series information on accelerator position, and information on drive force characteristics with respect to a current driving mode;
a determination part configured to determine whether or not an operation of the accelerator has been performed abnormally, based on the time-series information on accelerator position; and
a control part configured to provide control over a drive force of the subject vehicle, based on a current vehicle speed and a current accelerator position, and
when the determination part determines that the operation of the accelerator has been performed abnormally, the control part provides a drive force suppression control in which: a target accelerator position limit value is calculated, based on the information on drive force characteristics corresponding to the current vehicle speed and the current driving mode; and a drive force of the subject vehicle is suppressed, based on the calculated target accelerator position limit value without considering an operation amount obtained through a sensor of the accelerator.

2. The rapid acceleration suppression device according to claim 1,
wherein a correlation between a vehicle speed, accelerator position, and the drive force of the subject vehicle is defined in each of the drive force characteristics of the respective plurality of driving modes,
wherein the determination part is further configured to determine whether or not an anomaly has occurred in the vehicle speed, and
wherein, when the determination part determines that the anomaly has occurred in the vehicle speed, the control part provides the drive force suppression control in which: the target accelerator position limit value is calculated, based on characteristics data on a prescribed accelerator position from a drive force characteristic corresponding to a prescribed vehicle speed value and the current driving mode; and a drive force of the subject vehicle is suppressed based on the calculated target accelerator position limit value.

3. The rapid acceleration suppression device according to claim 2,
wherein the information acquisition part is further configured to acquire operation information on turning left or right,
wherein the determination part is further configured to determine whether or not an operation of turning left or right has been performed, based on the operation information on turning left or right, and
wherein, when the determination part determines that the operation of turning left or right has been performed, the control part terminates the drive force suppression control.

4. The rapid acceleration suppression device according to claim 2,
wherein the information acquisition part is further configured to acquire information on tilt angle of a road surface on which the subject vehicle is traveling,
wherein the determination part is further configured to determine whether or not a tilt angle on the road surface exceeds a prescribed tilt angle threshold, based on the information on tilt angle of the road surface, and
wherein, when the determination part determines that the tilt angle on the road surface exceeds the prescribed tilt angle threshold, the control part terminates the drive force suppression control.

5. The rapid acceleration suppression device according to claim 1,
wherein the information acquisition part is further configured to acquire operation information on turning left or right,
wherein the determination part is further configured to determine whether or not an operation of turning left or right has been performed, based on the operation information on turning left or right, and
wherein, when the determination part determines that the operation of turning left or right has been performed, the control part terminates the drive force suppression control.

6. The rapid acceleration suppression device according to claim 1,
wherein the information acquisition part is further configured to acquire information on tilt angle of a road surface on which the subject vehicle is traveling,
wherein the determination part is further configured to determine whether or not a tilt angle on the road surface exceeds a prescribed tilt angle threshold, based on the information on tilt angle of the road surface, and wherein, when the determination part determines that the tilt angle on the road surface exceeds the prescribed tilt angle threshold, the control part terminates the drive force suppression control.

7. The rapid acceleration suppression device according to claim 1,
wherein the control part is configured to provide an acceleration/deceleration control such that a current vehicle speed is maintained within a prescribed vehicle speed range, during implementation of the drive force suppression control.

8. The rapid acceleration suppression device according to claim 1,
wherein the information acquisition part is further configured to acquire information on shift position and information on object around the subject vehicle,
wherein the determination part is further configured to determine whether or not an object is present in a travel direction of the subject vehicle, based on the shift position, and
wherein, when the determination part determines that the object is present in the travel direction of the subject vehicle, based on the shift position, the control part provides control such that the subject vehicle is decelerated or stopped, irrespective of the operation of the accelerator.

9. The rapid acceleration suppression device according to claim 8,
wherein, when the determination part determines that the object is present in the travel direction of the subject vehicle, based on the shift position, and also when a distance between the subject vehicle and the object becomes as small as a collision caution distance, the control part terminates the drive force suppression control and provides a control such that the subject vehicle is decelerated or stopped.

10. The rapid acceleration suppression device according to claim 9, further comprising:
an alarm disposed inside the subject vehicle; and
a hazard flasher disposed outside the subject vehicle,
wherein, when the determination part determines that the object is present in a backward direction of the subject vehicle based on a shift position, when the obstacle is another vehicle, and when a distance between the subject vehicle and another vehicle becomes as small as the collision caution distance, then the control part provides control such that the alarm calls a driver's attention and that the hazard flasher blinks for a prescribed time period in a way different from that at normal times.

* * * * *